J. R. JOHNSON, C. S. HAMILTON & R. D. VAN DUYNE.
LABEL PASTING AND MARKING MACHINE.
APPLICATION FILED MAY 16, 1912.
1,108,583.
Patented Aug. 25, 1914.
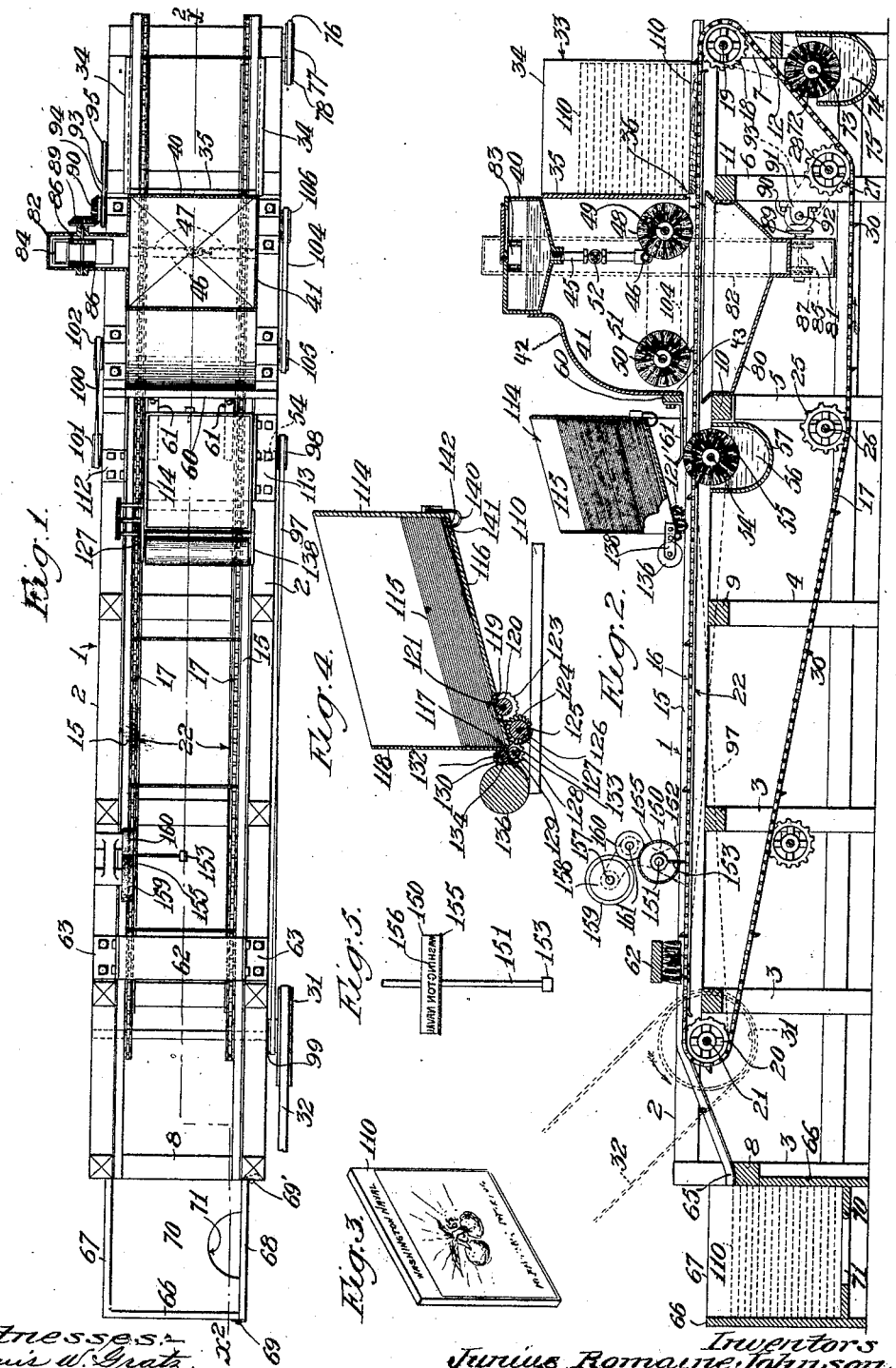

UNITED STATES PATENT OFFICE.

JUNIUS ROMAINE JOHNSON, CHARLES SUMNER HAMILTON, AND RICHARD DUDLEY VAN DUYNE, OF EAST HIGHLANDS, CALIFORNIA.

LABEL PASTING AND MARKING MACHINE.

1,108,583.      Specification of Letters Patent.      Patented Aug. 25, 1914.

Application filed May 16, 1912. Serial No. 697,790.

*To all whom it may concern:*

Be it known that we, JUNIUS ROMAINE JOHNSON, CHARLES SUMNER HAMILTON, and RICHARD DUDLEY VAN DUYNE, all citizens of the United States, residing at East Highlands, in the county of San Bernardino and State of California, have invented a new and useful Label Pasting and Marking Machine, of which the following is a specification.

This invention relates to a machine designed for the purpose of pasting labels upon the ends of fruit boxes and also marking the same to designate the variety of fruit packed in the box.

Referring to the drawings, which are for illustrative purposes only: Figure 1 is a plan view of a machine embodying a form of my invention. Fig. 2 is a longitudinal, sectional, view on line $x^2-x^2$ Fig. 1. Fig. 3 is a perspective view of a box head, showing a label thereon. Fig. 4 is an enlarged, sectional view of the label feeding device. Fig. 5 is an enlarged, detail plan view of the marking roller.

The machine comprises a frame 1 consisting of two longitudinal members 2, each supported on suitable uprights 3, 4, 5, 6 and 7; the longitudinal members 2 being spaced apart by cross bars 8, 9, 10, 11 and 12 which extend between the uprights 3, 4, 5, 6 and 7 respectively. Secured to the inner side of each of the longitudinal members 2 and extending the full length thereof is an angle bar 15 to form a supporting guide for the box heads as they travel through the machine in the manner hereinafter described.

16 designates a carrier which consists of two sprocket chains 17, each extending along the inner edge of the supporting guide 15, the receiving end of the carrier being supported on sprocket wheels 18 mounted on a shaft 19 supported between the uprights 7. The discharge end of the carrier is mounted on sprocket wheels 20 mounted on a shaft 21 which is supported in any suitable manner on the underside of the longitudinal members 2 at a point in the rear of the cross piece 9. The sprocket wheels 18 and 20 are so adjusted or arranged that the upper face of the chain is even with the supporting face of the guides 15. For sustaining the upper run of the sprocket chains 17 flush with the supporting face of the guides 15, as just described, each guide 15 is provided with an extension 22 which extends under the sprocket chains, thereby supporting the same. The sprocket chains 17 after passing over the sprocket wheels 20 pass downwardly under the sprocket wheels 25 mounted on a shaft 26, which shaft 26 is supported on the uprights 5. After passing under the sprocket wheels 25, the sprocket chains pass under sprocket wheels 27 mounted on a shaft 28 supported on the uprights 6, after which the sprocket chains travel upwardly over the sprocket wheels 18 heretofore described. Each of the sprocket chains 17 is provided with a series of lugs 30, which lugs 30 are so arranged as to extend upwardly from the chain when the chain is traveling along the upper run thereof, thereby providing engaging means to carry the box heads on the chains in the manner hereinafter described. Means are provided for driving the sprocket chains which consist of a pulley 31 mounted on the shaft 21, which pulley is revolved by means of a belt 32 which may be driven from any suitable power source, not shown.

The box heads are piled one above the other in a magazine 33, which consists of side walls 34 secured in any suitable manner to the longitudinal members 2 and an end wall 35, the lower portion of which is cut away, thereby providing an opening 36 of sufficient height above the chain to permit a single box head to be removed from the magazine and carried therefrom by the carrier.

The machine is provided with a paste reservoir 40 supported on two upright walls 41 and an end wall 42, which walls extend upwardly from the longitudinal members 2 of the frame of the machine, the lower edge of the wall 42 being cut away, as indicated at 43, for the purpose of permitting free passage of the box heads thereunder. The paste reservoir 40 is connected by means of a pipe 45 with a delivery pipe 46, which delivery pipe 46 is provided with a series of perforations 47 which deliver paste onto a rotary brush 48 mounted upon a shaft 49 between the side walls 41. A single rotary brush 50 is provided at the rear of the brush 48, which brush 50 is mounted on the shaft 51 supported between the side walls 41. The pipe 45 is provided with a suitable valve 52 for the purpose of regulating the flow of paste from the paste reservoir 40 to the delivery pipe 46. Mounted upon the shaft 54 at the rear of the wall 42 is a rotary brush 55 which extends across the machine between the chains 17, the lower portion of the brush 55 being arranged to extend into a body of water 56 in a tank 57 mounted in any suitable manner upon the longitudinal members 2 and across the bar 10. Mounted on a cross piece 60 which is supported on the wall 42 is a plurality of spring fingers 61 which extend rearwardly from the cross piece 60 to the upper edge of the brush 54 for the purposes hereinafter described. At the rear of the brush 54 is mounted a flat brush 62 being supported upon brackets 63 on the longitudinal members 2. The brush 62 is so arranged that the lower face of the brush is slightly above the upper face of the chains 17, for the purposes hereinafter described. The cross bar 8 is lower in height than the cross bars 9, 10 and 11 and has secured thereto in any suitable manner the ends 65 of the supporting guides 15, which guides 15 extend downwardly at an angle from a point adjacent to the sprocket wheels 20, so that the box ends after leaving the chains 17 slide downwardly of their own weight into a receiving hopper which consists of end walls 66, fixed side wall 67 and a side wall 68 hinged at 69 to one of the end walls 66, which side wall 68 is held in closed position by means of a spring latch 69'. The bottom wall 70 of the receiving hopper is cut away, as indicated at 71, so that by opening the hinged wall 68 the box heads may be removed bodily from the receiving hopper.

Means are provided for cleaning the chains of paste, which means consist of a rotary brush 72 mounted on a shaft 73 supported on the uprights 7. The brush 72 is so arranged that the lower portion of the brush extends into a body of water 74 in a reservoir 75, which reservoir 75 is supported on the uprights 7. The brush 72 is revolved by means of a belt 76 which runs over a pulley 77 on the shaft 19 and a pulley 78 on the shaft 73. Means are provided for catching the paste which may drop from the machine during the pasting operation, which means consist of a pan 80 having a downwardly extending hopper 81 connected by means of a casing 82, which casing extends upwardly on the side of the machine to the paste reservoir 40 where the casing 82 is provided with an opening 83. Arranged in the casing 82 is a bucket conveyer 84 which runs over sprockets 85 at the bottom of the casing 82 and sprockets 86 at the upper end thereof, the lower sprockets 85 being mounted on a shaft 87 provided with a bevel gear 89 which meshes with a bevel gear 90 supported in brackets 91 on the uprights 6, the shaft 92 being driven by means of a belt 93 which runs over a pulley 94 on the shaft 92 and a pulley 95 on the shaft 28. The rotary brush 55 is driven by means of a belt 97 which passes over a pulley 98 on the shaft 54 and a pulley 99 on the shaft 21. The rotary brush 50 is driven by means of a belt 100 which runs over pulleys 101, 102 on the shafts 54, 51 respectively. The brush 48 is driven by means of a belt 104 which runs over pulleys 105, 106 on the shafts 51, 49 respectively.

Mounted on brackets 112 and 113 on the members 2 is a magazine 114 adapted to hold a number of labels 115. The bottom 116 of the magazine is inclined downwardly toward a discharge opening 117 formed in the end wall 118 of the magazine, which opening 117 is wide enough to permit a single label to pass therethrough. The bottom 116 is also provided with an opening 119 adapted to receive a roller 120 on shaft 121, which shaft is supported on suitable brackets 121' on the magazine 114. The roller 120 engages the under face of the lowest label in the magazine and is rotated to move the engaged label through the discharge opening 117 by means of a gear 123 on the shaft 121 driven by a gear 124 on a shaft 125. Secured to shaft 125 is a roller 126 provided with a plurality of pins 127 which are engaged by the box head passing thereunder, thereby causing the shaft 125 to be rotated. The gear 124 is also engaged by a gear 128 on shaft 129, which gear 128 is engaged by a gear 130 on shaft 132. The shafts 129 and 130 are each provided with a roller 133 and 134 respectively between which the labels, as they leave the magazine, are gripped and fed to the box head. As the label leaves the rollers 133 and 134 it is pressed down on the coat of paste on the face of the box head by means of a roller 136 of rubber or other suitable material. The roller 136 is supported on brackets 138 secured to the magazine 114.

For the purpose of retarding the labels in the magazine above the bottom label, a spring detent is used consisting of a bent finger 140 mounted on the magazine 114, which finger 140 is provided with a pointed end 141 which extends upwardly through an opening 142 in the bottom of the magazine where it engages the lowermost label in the magazine thereby placing a tension thereon, and as the lowermost label is withdrawn from the magazine the finger materially assists in holding the next label from displacement.

In packing fruit it is frequently the case that several varieties of the same fruit are packed under the same label and under such circumstances it is desirable to mark the box to designate the variety of fruit therein. To accomplish this purpose we have provided a roller 150 secured to a shaft 151 mounted in a bracket 152. The shaft 151 is provided at its inner end with an arm 153 which extends downwardly into the path of the box heads so that the edge of the box heads as they are carried thereunder strike the arm 153 thereby starting rotation of the shaft. The rotation of the shaft 151 is continued by means of a series of pins 155 on the roller 150 which engage the face of the box head as it passes thereunder. The roller 150 is provided with type or raised letters 156 which contact with the face of the box head as it passes thereunder and imprint thereon the name of the variety of fruit to be packed in the box. The size of the roller 150 is so proportioned that the box head rotates the roller one complete revolution so that the arm 153 is in position to be engaged by the next box head.

Mounted on the bracket 152 by means of a shaft 157 is an inking wheel or roller 158 having a felt face 159 holding a supply of ink, which wheel is engaged by a hard rubber wheel 160 mounted on shaft 161 in the bracket 152. The wheel 160 is also in engagement with the type on the roller 150 which receives a supply of ink from the hard rubber wheel 160 which in turn receives ink from felt 159 on the roller 158.

From the above description it is readily seen that box heads carried on the chains 17 serve to operate the device for placing the labels on the respective box heads and also operate the marking device which stamps the name of the variety of fruit on the box head, as illustrated in Fig. 3.

The machine operates in the following manner: A number of box heads 110 are placed in the magazine 33 one upon another, the lowermost head resting upon the guides 15. The carrier is then started in motion moving in the direction of the arrow Fig. 2, during which movement of the carrier one of the lugs 30 on each chain 17 engages the rear edge of the lowermost box head and moves the same with the carrier from under the box heads in the magazine to the pasting brush 48, the pasting brush having been supplied with paste from the perforations 47 in the delivery pipe 46. As the box head passes under the brush 48, the whole upper surface of the box head is coated with paste and as the carrier carries the box head under the brush 50, the paste upon the box head is spread upon the same evenly, after which the box head passes under the wall 42, the forward end of the box head coming in contact with the brush 54, being held down in engagement therewith by means of the spring fingers 61. The brush 55 removes the surplus paste from the forward and rear edges of the head as it passes thereover, the spring fingers 61 holding the box head in engagement with the brush. The box head next engages the teeth on the roller 126, thereby rotating the shaft 125 which rotates the roller 120 to start a label as hereinbefore described. The label passes out of the magazine 114 between the rollers 133, 134 and is pressed down on the pasted surface of the box head as hereinbefore described. The labeled box head then comes into engagement with the arm 153 on shaft 151 and the pins 155 on the roller 150 which operate the roller 150 to imprint the name of the variety of fruit thereon, as hereinbefore described. The box head then passes under flat brush 62, which brush smoothes the label on the head of the box. After passing under the brush 62 the box head slides downwardly on the inclined ends of the supporting guides 15 into the receiving hopper at the end of the machine from whence the box heads may be removed by opening the wall 68 of the hopper in the manner heretofore described. Accumulation of paste on the brush 55 is prevented by the body of water in the reservoir 57, and accumulation of paste on the carrier chains 17 is prevented by means of the brush 72 which rotates in the water in the reservoir 75.

What we claim is:—

1. A machine for pasting labels on box heads comprising a frame, a magazine on said frame for holding a series of box heads, a movable carrier in said frame, means on said carrier for successively removing a single box head from said magazine, a rotary brush adapted to engage the upper face of said box head, a paste reservoir, means for delivering paste from said reservoir to said rotary brush, a rotary spreading brush behind said first named brush adapted to engage the upper face of said box head, a rotary cleaning brush behind said spreading brush adapted to engage the end of said box head, and a stationary brush adapted to smooth a label on the coated face of said box head.

2. A machine for pasting labels on box heads comprising a frame, a magazine on said frame for holding a series of box heads, a pair of supporting guides extending longitudinally in said frame, a carrier chain on the inside of each supporting guide, projections on each of said chains adapted to engage the lower box head in the magazine and remove the same therefrom, means for applying paste to the upper face of said box head, means for smoothing the paste thereon, means for removing the paste from the ends of said box head, means for smoothing a label on the coated face of said box head, a hopper at the end of said machine, and means for delivering said box head into said hopper.

3. A machine for pasting labels on box heads comprising a frame, a magazine mounted on said frame adapted to retain a series of box heads one above another, a pair of supporting guides extending longitudinally in said frame adapted to support said box heads in the magazine, a movable carrier in said frame consisting of a chain on the inner side of each supporting guide, means on each of said chains adapted to engage the lower head in said magazine and remove the same therefrom, a rotary brush adapted to engage the upper face of said box head, a paste reservoir, a perforated delivery pipe connected to said reservoir and adapted to deliver paste on said brush, a rotary spreading brush at the rear of said first named brush, a rotary cleaning brush behind said spreading brush adapted to engage the forward and rear ends of said box head, a series of elastic fingers adapted to hold said box head on said cleaning brush, a stationary brush for smoothing a label on the coated face of said box head, a magazine at the end of said supporting guides, and means for cleaning said chains, said means consisting of a reservoir having a body of water therein and a rotary brush adapted to engage said chains and extend into said water.

4. A machine for pasting labels on box heads comprising a frame, a magazine mounted on said frame adapted to retain a series of box heads one above another, a pair of supporting guides extending longitudinally in said frame adapted to support said box heads in the magazine, a movable carrier in said frame consisting of a chain on the inner side of each supporting guide, means on each of said chains adapted to engage the lower head in said magazine and remove the same therefrom, a rotary brush adapted to engage the upper face of said box head, a paste reservoir, a perforated delivery pipe connected to said reservoir adapted to deliver paste on said brush, a rotary spreading brush at the rear of said first named brush, a rotary cleaning brush behind said spreading brush adapted to engage the forward and rear ends of said box head, a series of elastic fingers adapted to hold said box head on said cleaning brush, a stationary brush for smoothing a label on the coated face of said box head, a magazine at the end of said supporting guides, means for cleaning said chains, said means consisting of a reservoir having a body of water therein, a rotary brush adapted to engage said chains and extending into said water, a hopper under the pasting brush and spreading brush adapted to catch the surplus paste therefrom, and means for carrying the paste from said hopper to the paste reservoir.

5. A machine for pasting labels on box heads comprising a frame, a magazine mounted on said frame adapted to hold a series of box heads therein one above another, a pair of supporting guides extending longitudinally in said frame adapted to support said box heads in said magazine, a movable carrier in said frame consisting of an endless chain on the inner side of each supporting guide, a plurality of sets of sprocket wheels on said frame adapted to support said chains, means for driving one set of sprocket wheels to drive said chains, means for supporting said chains between said sprocket wheels, means on each chain adapted to engage the lower box head in said magazine and remove the same therefrom, a rotary paste brush adapted to engage the upper face of said box head, a paste reservoir, means for supplying paste to said paste brush, a rotary spreading brush adapted to engage the upper face of said box head behind said paste brush, a rotary cleaning brush behind said spreading brush adapted to engage the forward and rear ends of said box head, a series of elastic fingers adapted to hold said box head on said cleaning brush, a stationary brush for smoothing a label on the coated face of said box head, a magazine at the rear end of said supporting guides, and means for rotating all of said brushes.

6. A machine for pasting labels on box heads comprising a frame, a movable carrier in said frame, a magazine for holding a series of box heads, means on said carrier for successively removing a single box head from said magazine, means for applying a coat of paste to one face of said box head, a label magazine having a discharge opening, means operated by the box heads on said carrier for removing a label from said magazine and depositing the label on the box head, said means comprising a roller having pins thereon adapted to be engaged by the box head, a roller in engagement with the lowest label in said magazine operated by said first named roller, a pair of feed rollers adapted to engage the label as it passes through the discharge opening, means for rotating said feed rollers, and a presser roller adapted to press the label on the box head.

7. A machine for pasting labels on box heads comprising a frame, a movable carrier in said frame, a magazine for holding a series of box heads, means on said carrier for successively removing a single box head from said magazine, means for applying a coat of paste to one face of said box head, means operated by the box heads on said carrier to place a label on each box head, and means operated by the box heads on said carrier for marking each box head.

8. A machine for pasting labels on box heads comprising a frame, a movable carrier in said frame, a magazine for holding a series of box heads, means on said carrier for successively removing a single box head from said magazine, means for applying a coat of paste to one face of said box head, means operated by the box heads on said carrier to place a label on each box head, means operated by the box heads on said carrier for marking each box head, said means consisting of a shaft, a type roll on said shaft adapted to engage the face of the box heads, a series of pins secured to said type roll adapted to engage the face of the respective box heads, means for inking said type roll, and an arm on said shaft extending into the path of said box heads.

9. A machine for pasting labels on box heads comprising a frame, a continuously moving endless carrier in said frame, a magazine for holding a series of box heads, means on said carrier for successively removing a single box head from said magazine, means for applying a coat of paste to one face of said box head, a label magazine, and means operated by the box heads on said carrier for removing a label from said magazine and depositing the label on the box head.

In testimony whereof, we have hereunto set our hands at East Highlands, California, this ninth day of May, 1912.

JUNIUS ROMAINE JOHNSON.
CHARLES SUMNER HAMILTON.
RICHARD DUDLEY VAN DUYNE.

In presence of—
T. C. SANFORD,
J. S. EDWARDS.